(12) United States Patent
Wise et al.

(10) Patent No.: US 8,456,736 B2
(45) Date of Patent: Jun. 4, 2013

(54) DIVIDED-PULSE AMPLIFICATION OF SHORT PULSES

(75) Inventors: Frank W. Wise, Ithaca, NY (US); Shian Zhou, Rochester, NY (US); Dimitre G. Ouzounov, Ithaca, NY (US)

(73) Assignee: Cornell University, Ithaca, NY (US)

( * ) Notice: Subject to any disclaimer, the term of this patent is extended or adjusted under 35 U.S.C. 154(b) by 798 days.

(21) Appl. No.: 12/517,092

(22) PCT Filed: Dec. 3, 2007

(86) PCT No.: PCT/US2007/086313
§ 371 (c)(1),
(2), (4) Date: Jan. 20, 2010

(87) PCT Pub. No.: WO2008/127451
PCT Pub. Date: Oct. 23, 2008

(65) Prior Publication Data
US 2010/0142034 A1    Jun. 10, 2010

Related U.S. Application Data

(60) Provisional application No. 60/861,977, filed on Dec. 1, 2006.

(51) Int. Cl.
*H04B 10/17* (2006.01)
*H01S 3/10* (2006.01)

(52) U.S. Cl.
USPC .................. 359/341.1; 359/334; 359/349

(58) Field of Classification Search
USPC .................. 359/341.1, 334, 349, 333
See application file for complete search history.

(56) References Cited

U.S. PATENT DOCUMENTS

| 6,310,715 B1 * | 10/2001 | Moore ................ 359/334 |
| 7,253,945 B2 * | 8/2007 | Kong et al. ............ 359/334 |
| 2002/0003650 A1 * | 1/2002 | Usami et al. .......... 359/248 |

FOREIGN PATENT DOCUMENTS

JP    05003455 A  *  1/1993

* cited by examiner

*Primary Examiner* — Eric Bolda
(74) *Attorney, Agent, or Firm* — William A Blake

(57) ABSTRACT

To avoid harmful nonlinear effects in the amplification of short optical pulses, an initial pulse is divided into a sequence of lower-energy temporally spaced pulses that are otherwise identical to the original pulse. The low-intensity pulses are amplified and then recombined to create a final amplified output pulse.

20 Claims, 4 Drawing Sheets

US 8,456,736 B2

DIVIDED-PULSE AMPLIFICATION OF SHORT PULSES

CROSS REFERENCE TO RELATED APPLICATIONS

This application claims the benefit under 35 USC 119(e) of U.S. Provisional Application No. 60/861,977, filed Dec. 1, 2006.

GOVERNMENT SPONSORSHIP STATEMENT

The work on this invention was supported by the National Science Foundation under Grant No. ECS-0500956 and PHY-0131508. The Government has certain rights in the invention.

BACKGROUND OF THE INVENTION

1. Field of the Invention

The present invention relates in general to a short-pulse amplification technique which reduces or avoids nonlinear effects, thus allowing higher pulse energies without pulse distortion. A pulse to be amplified is divided into a selected number of smaller magnitude pulses that are otherwise identical in shape to the original pulse. The pulses are amplified and then recombined coherently to produce a final output pulse that is an amplified version of the original pulse.

2. Description of the Background Art

Ultrashort light pulses on the order of picoseconds or shorter are now finding application in a wide range of science and technology. Many applications require high-energy pulses, which are obtained by amplifying low-energy pulses generated by a laser. Amplification of the pulses with high fidelity is crucial, but nonlinear phase shifts accumulated by an intense pulse generally distort its spectral and temporal profiles. Dispersion management, exemplified by chirped-pulse amplification, has proved to be an effective way to control nonlinearity. However, the limits of chirped-pulse amplification are reached by many sources of picosecond and femtosecond pulses.

If an optical pulse accumulates a nonlinear phase shift $$\Phi^{NL}(t, z) = \frac{\omega}{c} \int n_2 I(t, z) dz$$

(where I is the intensity and $n_2$ is the nonlinear refractive index of the medium) that is greater than ~1, its spectral, temporal, and/or spatial profiles are likely to be distorted. In chirped-pulse amplification (CPA), a pulse is stretched temporally by a dispersive delay line. The stretched (thus frequency-chirped) pulse is amplified, and then the pulse is dechirped to its initial duration in another dispersive delay line. This technique reduces the intensity when the pulse is propagating through the (solid) amplifying medium, and allows the intensity to be a maximum when the pulse is propagating linearly. Self-similar amplification also controls nonlinearity through dispersion.

Short-pulse amplifiers based on CPA have been responsible for a major fraction of the ultrafast science performed to date. There is ongoing interest in the generation of ultrashort pulses with ever-higher energies, for applications such as the generation of attosecond pulses and ultrafast x-rays. Many existing CPA systems are operated close to the limit $\Phi^{NL}$~1, owing to limitations on the stretching ratio. In practice, it is difficult to stretch and compress a pulse by more than a factor of $10^4$ with high fidelity. As a separate issue, practical devices that provide enough dispersion to stretch and compress high-energy pulses longer than a few picoseconds do not exist.

SUMMARY OF THE INVENTION

The present invention is directed to a short-pulse amplification technique which produces improved performance over known CPA techniques, along with ease of implementation, in some situations. In this technique, referred to as divided-pulse amplification (DPA), a pulse to be amplified is divided into a plurality of smaller copies of itself. The pulses are approximately equally-spaced temporally in a sequence and have the same shape as the original pulse, but are of lower magnitude and energy. The sequence of pulses is amplified and then the pulses in the sequence are recombined coherently to produce a final large energy pulse, which is an amplified version of the original pulse. This arrangement reduces or avoids the nonlinear effects associated with other short-pulse amplification techniques.

An essential component of the DPA technique is the process of pulse division and recombination. In the preferred embodiments, birefringent components are employed to divide an incoming pulse and later recombine the amplified pulses into an output pulse. More particularly, in a first preferred embodiment, a sequence of birefringent crystals is employed to split the pulse into a desired number of pulses. The crystals at odd-numbered positions in the sequence have their optic axes oriented at a 45-degree angle relative to the direction of linear polarization of the pulse to be amplified, while those at the even-numbered positions are oriented in the same direction as the polarization. At each crystal, a pulse is split into two equal-intensity pulses, one an ordinary (o) wave and one an extraordinary (e) wave. The "o" and "e" pulses are separated in time because the group velocities of the o- and e-waves are different from one another. In this manner, a sequence of pulses is generated in which the linear polarizations of adjacent pulses alternate.

The length of each crystal determines the time spacing $\Delta t$ of the pulses. The length of the shortest crystal (which is selected to be the first crystal, $L_1$) is chosen so that $\Delta t$ exceeds the pulse duration. To produce equally-spaced pulses, the length of the $m^{th}$ crystal in the sequence should be $L_m = 2^{m-1} L_1$. A sequence of M crystals thus splits the original pulse into $2^M$ pulses, with alternating linear polarizations.

After passing through one or more amplification stages, the amplified pulses are preferably recombined in a sequence of crystals similar to the one that divided the pulses. In some cases, the pulses can be recombined by passing them in reverse order through the same sequence of crystals used to divide the input pulse.

In each of the embodiments of the invention, amplification of the pulses can be achieved through known techniques. Use of polarization insensitive components, such as optical fiber amplifiers, is preferred in view of the different polarizations of the alternating pulses in the pulse sequence. However, a polarization sensitive amplifier, such as a regenerative amplifier, can also be used in another embodiment of the present invention. In this embodiment, a polarization beam splitter is employed to separate the horizontal and vertical polarization components in the pulse sequence to be amplified. The separated pulses are passed in opposite directions through a polarization sensitive amplifier that amplifies only one of the two polarization components in either direction. A half wave plate is employed to rotate the other polarization component to the correct value before passing through the amplifier. The amplified polarization components of the pulse sequence are then recombined as they go in the reverse direction back through the beam splitter. Finally, each of the pulses in the sequence is combined into a final single amplified output pulse as they pass in the reverse direction through the divider/combiner.

BRIEF DESCRIPTION OF THE DRAWINGS

The features and advantages of the present invention will become apparent from the following detailed description of preferred embodiments thereof, taken in conjunction with the accompanying drawings, which are briefly described as follows.

FIG. 3A shows the initial pulse spectrum; FIG. 3B shows the initial pulse autocorrelation; FIGS. 3C and 3D show the amplified spectrum and autocorrelation without DPA, respectively; and, FIGS. 3E and 3F show the amplified spectrum and autocorrelation with DPA, respectively.

FIG. 4A shows the initial pulse spectrum; FIG. 4B shows the initial pulse autocorrelation; FIGS. 4C and 4D show the amplified spectrum and autocorrelation without DPA, respectively; and, FIGS. 4E and 4F show the amplified spectrum and autocorrelation with DPA, respectively.

DETAILED DESCRIPTION OF THE INVENTION

Figure 1:
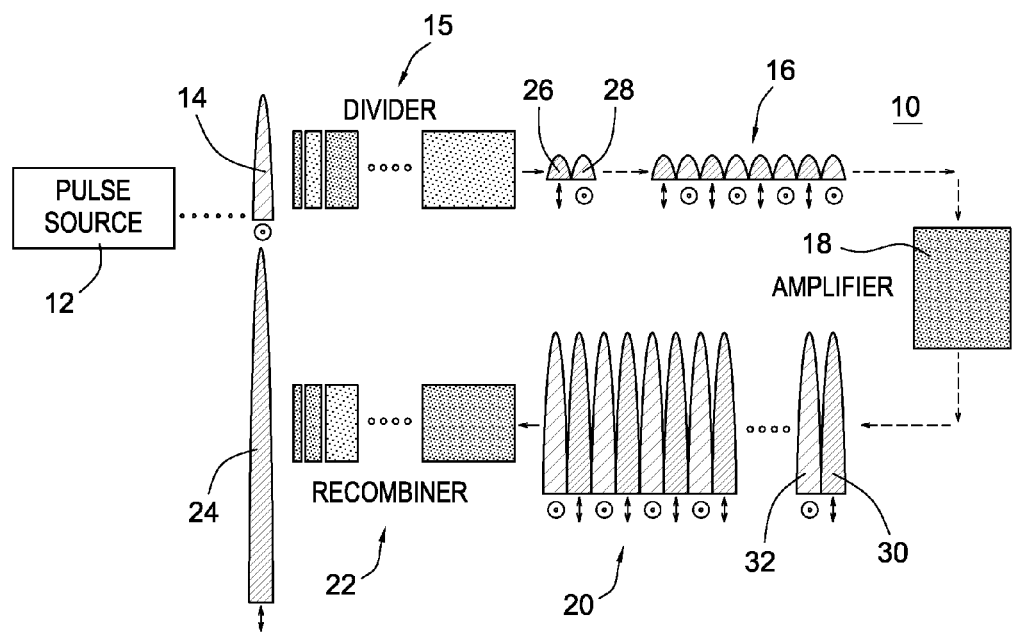
FIG. 1 illustrates the basic elements needed to implement any embodiment employing the DPA principle of the present invention.

FIG. 1 is a schematic illustration of a pulse amplifier 10 that is designed to operate in accordance with the DPA principle of the present invention. A pulse source 12, such as a laser oscillator, generates a pulse 14 to be amplified. The pulse 14 is first fed though a pulse divider 15 which divides the original pulse 14 into N smaller copies of itself. N is dependent on the number of divider stages M, where $N=2^M$. The N pulses form a sequence of pulses 16 which is amplified in one or more amplifier stages 18 having a gain G. Finally, the N amplified pulses 20 are passed through a recombiner 22 which combines the amplified pulses 20 to form one large amplified pulse 24. The pulse 24 is a version of the original pulse 14 that has been amplified by the factor G.

An essential component of DPA is the process of pulse division and recombination. It is known, theoretically that a pulse can be split and then recombined in a birefringent crystal. One embodiment of the present invention can thus consist of first and second sets of crystals for division and recombination, which are suitably chosen (lengths, transverse dimensions) for the given application. However, other birefringent materials could be used in place of the crystals. One obvious material to consider is optical fiber, which is birefringent in general. The divider and recombiner can thus be implemented as segments of fiber, which are ultimately connected together. For high-pulse-energy devices, the fiber can be large-mode-area photonic-crystal fiber or hollow-core photonic-bandgap fiber, to reduce nonlinear effects. In addition, the pulse dividing and recombining functions can be combined into one component by reversing the direction through which incoming and outgoing pulses pass. Other more conventional optical elements could be used for dividing and recombining the pulses, such as beam splitters and delay lines. The use of birefringent crystals is preferred because of the simplicity of the design.

In the case where birefringent crystals or other birefringent elements are used, the sequence of pulses 16 shown in FIG. 1 includes a first group of pulses 26 in which the pulses are each of a first linear polarization and a second group of pulses 28 in which the pulses are of an opposite linear polarization. The pulses 26 and 28 are interleaved with one another so that pulses of the first polarization alternate with those the opposite polarization. The same holds true for the sequence of amplified pulses 20 which includes a first group of pulses 30 of the first polarization and a second group of pulses 32 of the opposite polarization. This will be discussed in greater detail in conjunction with FIG. 2

Figure 2:
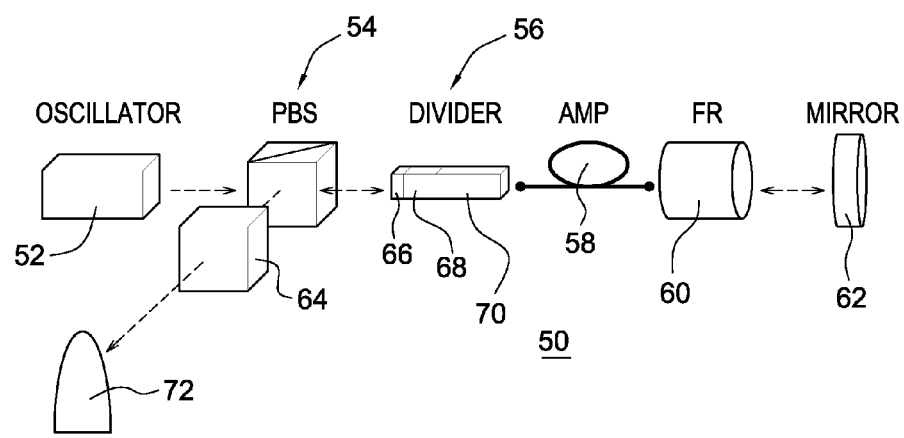
FIG. 2 is a schematic illustration of an embodiment of the invention that was actually constructed and employed in experiments used to verify operation of the invention.

FIG. 2 is a schematic illustration of an embodiment of the invention that was actually constructed and employed in experiments used to verify the operational principles of the invention. A pulse amplifier 50 is shown which comprises an oscillator 52, a polarization beam splitter (PBS) 54, a combination pulse divider/combiner 56; a ytterbium (Yb) fiber amplifier 58; a 45° Faraday rotator 60; and, a mirror 62. A grating compressor 64 is placed as the last element after the PBS 54 for femtosecond-pulse operation, but is not necessary for picosecond operation.

In the pulse amplifier 50, the pulse divider/combiner 56 is implemented by a stack of three birefringent crystals 66, 68 and 70 through which pulses pass in sequence. Regardless of the number of crystals, the crystals at odd-numbered positions (1, 3, 5, etc.) in the sequence have their optic axes oriented at a 45-degree angle relative to the direction of linear polarization of the pulse to be amplified, while the crystals at the even-numbered positions (2, 4, 6, etc.) are oriented in the same direction as the polarization of the input pulse. Thus, the pulses have their two perpendicular polarizations interleaved. The optic axes of neighbor crystals are rotated 45° about the direction of propagation. The output pulse polarization is perpendicular to that of the input pulse.

At each of the crystals 66, 68 and 70, a pulse is split into two equal-intensity pulses, one an ordinary (o) wave and the other an extraordinary (e) wave. The "o" and "e" pulses are separated in time by $\Delta t = |1/v_e - 1/v_o|L$, where $v_o$ and $v_e$ are the group velocities of the o- and e-waves and L is the crystal length. The length of the shortest crystal (which is the first crystal 66, with length $L_1$) is chosen so that $\Delta t$ exceeds the pulse duration. To produce equally-spaced pulses, the length of the $m^{th}$ crystal in the sequence should be $L_m = 2^{m-1}L_1$. A sequence of crystals splits the original pulse into $2^n$ pulses, with alternating linear polarizations. In the embodiment shown in FIG. 2, for convenience, the amplified pulses are recombined by being passed in the reverse direction through the same sequence of crystals 70, 68 and 66. Alternatively, a separate stack of crystals could be employed for this purpose as in FIG. 1.

The final amplified input pulse 72 is passed out of the PBS 54 at a 90 degree angle relative to the input received from the oscillator 52. In the case of femtosecond operation, the output pulse is fed through the grating compressor 64, which is implemented by a pair of gratings as is conventional.

In the experiment, a Yb fiber soliton laser 12 generates seed pulses of either 2.6 ps or 300 fs duration at 1038 nm. The repetition rate is 47 MHz and the pulse energy is ~0.2 nJ. The amplifier 58 was implemented by a polarization-insensitive Yb-doped fiber 1.5 m long that provides (intensity) gain of ~12. Yttrium vanadate (YVO$_4$) was chosen as the birefringent material for the crystals 66, 68 and 70 for its large polarization mode delay (~1 ps/mm) and excellent transparency in the range of 500-2000 nm. The crystals 66, 68 and 70 are a-cut crystals with lengths of 6.5 mm, 10 mm, and 22, respectively, which therefore divide the initial pulse into 8 sub-pulses. In the pulse amplifier 50 used in the experiment, the same sequence of crystals, but in reverser order (70, 68 and 66) was used to recombine the pulses after amplification. The Faraday rotator mirror 60 rotates the polarization of the divided pulses by 90 degrees. Pulses that were e-waves during pulse division become o-waves during pulse recombination, and vice-versa, so all pulses experience the same total delay and recombine into the final amplified pulse 72.

Figure 3A:
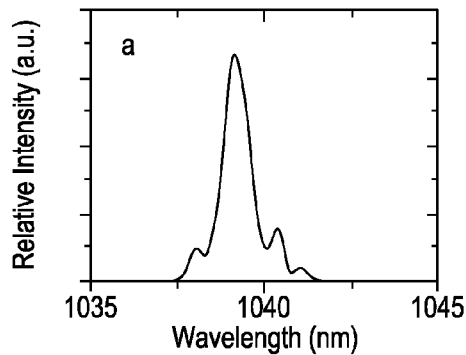
FIGS. 3A-3F are graphs showing results of the experiments with DPA of picosecond pulses.
Figure 3B:
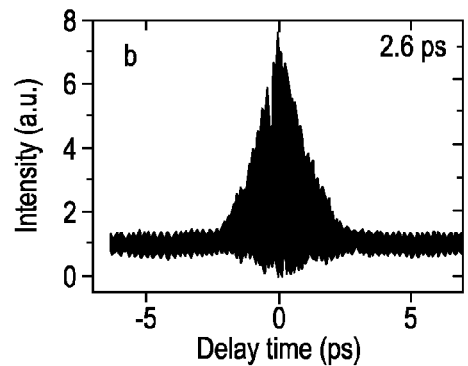

To demonstrate division and faithful recombination of picosecond pulses during experiments on the pulse amplifier 50, the amplifier 58 was first bypassed. The fiber oscillator 52 produced 2.6-ps pulses with 0.8-nm bandwidth. The spectrum and pulse autocorrelation after division and recombination are essentially identical to those of the initial pulse, which are shown in FIG. 3A and FIG. 3B, respectively. The insertion loss of the divider crystals 66, 68 and 70 is about 10%, and this could easily be reduced to <1% with anti-reflection coatings.

Figure 3C:
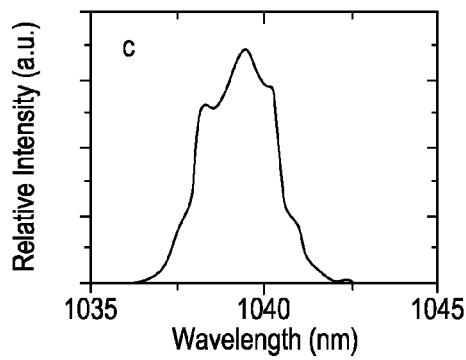
Figure 3D:
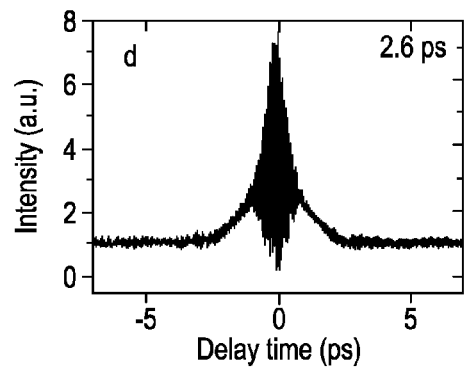
Figure 3E:
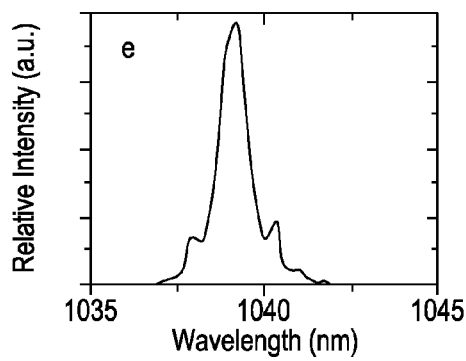
Figure 3F:
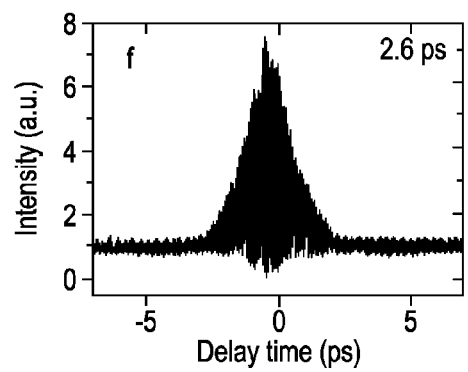

As a control experiment, the 2.6-ps pulses were amplified without DPA. The group-velocity dispersion (GVD) of all components is negligible for the 2.6-ps pulse duration. The pulse was amplified to 2 nJ. The nonlinear phase shift accumulated by the pulse is estimated as $\Phi^{NL} \approx \pi$. The spectrum (FIG. 3C) and autocorrelation (FIG. 3D) exhibit substantial distortions, as expected owing to the nonlinear phase shift. With the three-crystal divider/recombiner, the nonlinear phase shift is reduced to $\Phi^{NL} < 1$, and the spectrum (FIG. 3E) and pulse autocorrelation (FIG. 3F) become nearly identical to those of the initial pulse. The fringes observed in the autocorrelations (FIG. 3F) confirm that the pulses are coherently recombined. For comparison, a chirped-pulse amplifier (CPA) system designed to stretch 2.6-ps pulses by a factor of 8 would require the dispersion of ~10 km of fiber, and compression after amplification would be impractical. There are therefore a number of picosecond based systems that could benefit from the DPA technique.

Figure 4A:
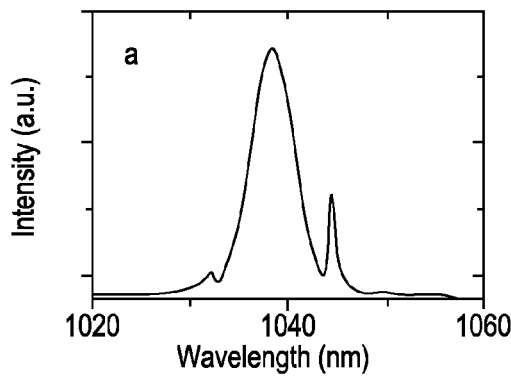
FIGS. 4A-4F are graphs showing results of the experiments with DPA of femtosecond pulses.
Figure 4B:
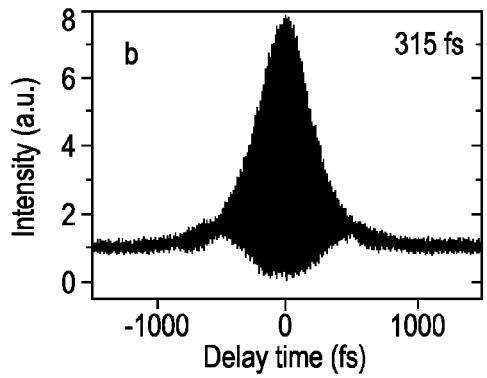

For the amplification of shorter pulses, the GVD of the divider crystals and the amplifier 58 will become significant. The total of ~40 mm of YVO$_4$ employed in these experiments presents negligible GVD for pulses longer than ~200 fs. The fiber oscillator 52 was adjusted to generate ~300-fs pulses (FIGS. 4A and 4B). After traversing the divider/combiner 56. Faraday rotator 60 and divider/recombiner 56 in reverse, the spectrum and autocorrelation were unchanged (data not shown), which verifies the division/recombination process. The pair of diffraction gratings (600 lines/min) 64 was employed to compensate the GVD of the amplifier 58. It should be noted that the apparatus is not designed to be a chirped-pulse amplifier, nor a self-similar amplifier; the gratings 64 are adjusted to simply compensate the GVD of the gain fiber 58 in linear propagation.

Figure 4C:
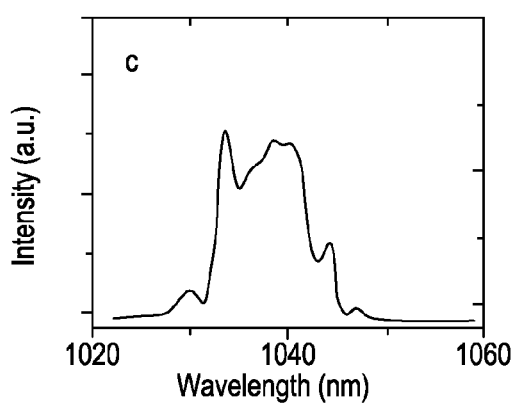
Figure 4D:
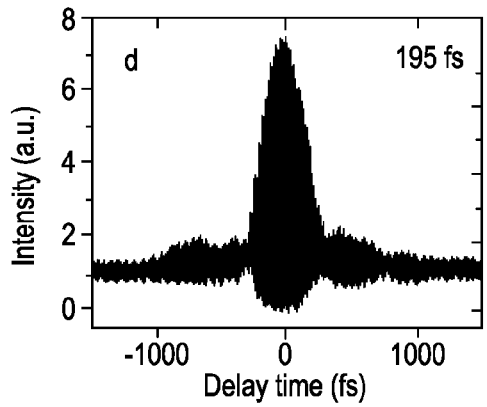
Figure 4E:
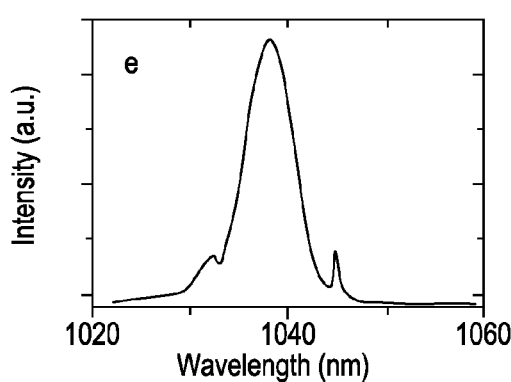
Figure 4F:
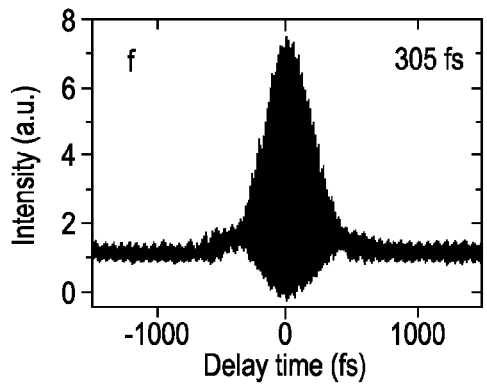

As the control measurement, the divider crystals 66, 68 and 70 were removed and the pulses were amplified to 1 nJ, which corresponds to a nonlinear phase shift $\Phi^{NL} \approx 2\pi$. As a result, the spectrum (FIG. 4C) and autocorrelation (FIG. 4D) are distorted significantly. The accumulation of the nonlinear phase shift in the presence of normal GVD allows for some pulse compression in this case, but that is incidental. The key point is that the amplified pulse is not a faithful replica of the input pulse. In contrast, amplification to the same pulse energy with the DPA technique of the present invention produces minimal distortion as illustrated in FIGS. 4E and 4F.

Much greater impact will come from scaling DPA to higher performance levels. Larger divisors and hence larger pulse energies will be straightforward. Division of 100-fs pulses by 1000, e.g., will require 10 crystals, with a total length of ~20 cm. This is comparable to the size of a grating stretcher and is much simpler. For large-enough pulse energies, the amplified beam may be expanded spatially before recombination in large-aperture crystals to avoid excessive nonlinear phase shift in the recombiner itself. In this case separate divider and recombiner sequences may be preferred. It should be noted that it is not necessary to match the lengths of divider and recombiner crystals to sub-wavelength accuracy, because pulses with orthogonal polarizations recombine. Mismatch of the lengths will produce elliptical polarization across the edges of the pulse, but not destructive interference. The pulse duration will increase proportionally to the length mismatch. Incidentally, it was also verified experimentally that recombination in a separate divider produces a faithful replica of the 2.6-ps pulse.

Implementation of DPA with 100-fs pulses will require matching of the path lengths in the divider and recombiner to ~10 microns, which is readily achievable. Some form of dispersion control will also be needed. Faithful recombination of 100-fs pulses has in fact been verified experimentally. With divider crystals of more than one kind of material, it may be possible to construct divider/recombiner sequences with net zero GVD at some wavelengths. Finally, it should be possible to combine CPA and DPA to design hybrid amplifiers that out-perform either technique by itself.

DPA offers significant practical features. The sequence of divider/combiner crystals 66, 68 and 70 is trivial to align optically. It is not necessary to divide the input pulse into equal-energy pulses, nor need they be equally-separated (as illustrated by the experiments described above, where the crystal lengths are not the nominal values). Because the divided pulses alternate polarization directions. DPA is ideally-suited to polarization-insensitive amplifiers such as the fiber amplifiers of the first and second embodiments.

Figure 5:
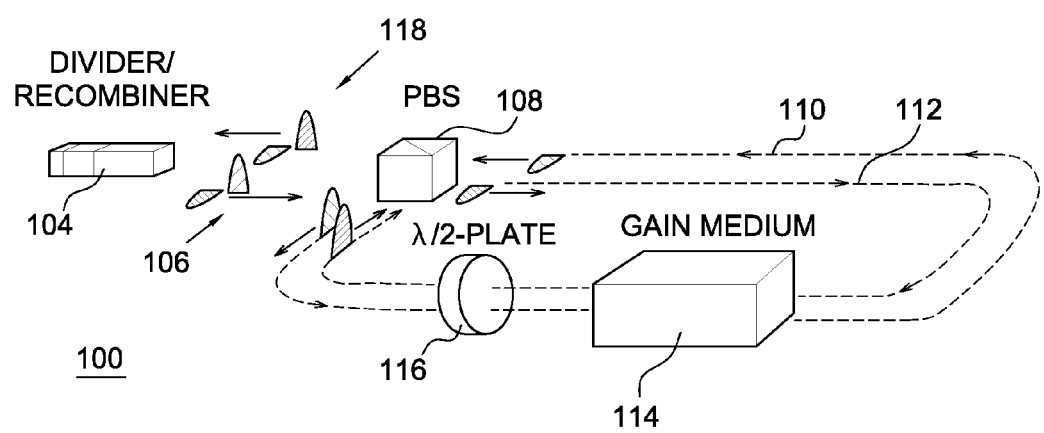
FIG. 5 illustrates a second embodiment of the present invention, which allows the DPA technique to be employed with a polarization-sensitive amplifier.

However, DPA can also be adapted to polarization-sensitive amplifiers. FIG. 5 illustrates an exemplary embodiment of a DPA based pulse amplifier 100 that is compatible with existing regenerative amplifiers. An input pulse 102 is passed through a combination divider/recombiner 104 to form a sequence of smaller pulse replicas 106 with alternating orthogonal polarizations as in the other embodiments of the invention. The different polarization pulses are separated with a polarizing beam splitter (PBS) 108, and are directed in opposite directions as counter-propagating beams 110 and 112 through a gain medium 114 that requires a specific direction of linear polarization (assumed to be horizontal). A ½ wave plate 116 exchanges the direction of polarization of the counter-propagating beams, ensuring the correct polarizations for the beam entering the gain medium 114. The ½ wave plate 116 also reverses the two polarization pulse replicas 110 and 112 before they pass through the PBS 108 and form an amplified sequence of pulses 118 that are passed through the divider/recombiner 104 in the reverse direction to form the final amplified pulse.

Although the invention has been disclosed in terms of a number of preferred embodiments and variations thereon, it will be understood that numerous additional variations and modifications could be made thereto without departing from the scope of the invention as defined by the following claims.

The invention claimed is:

1. A system for amplifying optical pulses comprising:
   a pulse divider for receiving an input pulse of a first energy level to be amplified and dividing said input pulse into a sequence of temporally spaced lower-energy pulses;
   an amplifier for receiving said sequence of lower-energy pulses and generating a sequence of temporally spaced amplified pulses; and
   a combiner for combining the temporally spaced pulses in said amplified sequence of pulses into an output pulse that is an amplified version of said input pulse.

2. The system of claim 1, wherein said divider comprises a sequence of M birefringent elements which divide said initial pulse into a sequence of $2^M$ pulses, said sequence of pulses including a first group of pulses having a first linear polarization and a second group of pulses having a second, orthogonal polarization, said pulses in said first and second groups being interleaved with one another so that said sequence of pulses have alternating linear polarizations.

3. The system of claim 2, wherein said birefringent elements comprise a sequence of birefringent crystals 1, 2, ..., N, wherein the crystals at odd-numbered positions in the sequence have their optic axes oriented at a 45-degree angle to a direction of linear polarization of the pulse to be amplified, while the crystals at the even-numbered positions are oriented in the same direction as the linear polarization of the pulse to be amplified, so that at each crystal, a pulse is split into two equal-intensity pulses, one an ordinary (o) wave pulse and a second extraordinary (e) wave pulse.

4. The system of claim 3, wherein said o and e pulses are separated in time by $\Delta t = |1/v_e - 1/v_o| L$, where $v_o$ and $v_e$ are the group velocities of the o- and e-waves and L is the crystal length; the length of the shortest crystal in said sequence of crystals is chosen so that $\Delta t$ exceeds the pulse duration; and the length of the $m^{th}$ crystal in the sequence is $L_m = 2^{m-1} L_1$ to produce equally-spaced pulses.

5. The system of claim 2, wherein said recombiner is a second sequence of birefringent crystals.

6. The system of claim 5, wherein said birefringent crystals are formed from Yttrium vanadate.

7. The system of claim 2, wherein the alternating pulses with orthogonal polarizations are separated with a polarizing beamsplitter, and counter-propagate through a gain medium that requires specific direction of linear polarization; and, a wave plate exchanges the direction of polarization of the counter-propagating beams, ensuring the correct polarizations for the beam entering the gain medium, and reverses the pulse replicas before the replicas are recombined into a final output pulse.

8. The system of claim 1, wherein a polarization-insensitive Yb-doped fiber is employed to amplify said pulses.

9. The system of claim 1, wherein a mirror is employed to rotate the polarization of the divided pulses by 90 degrees before they are recombined so that all pulses experience the same total delay and recombine into said output pulse.

10. The system of claim 1, wherein said divider and said recombiner are implemented by a single stack of birefringent crystals wherein for pulse division a pulse is passed in a first direction through said stack of crystals and for pulse recombination, a sequence of pulses is passed in a second, opposite through an opposite direction through said stack of birefringent crystals.

11. A method for amplifying optical pulses comprising the steps of:
    dividing an initial pulse of a first energy level into a sequence of temporally spaced lower-energy pulses;
    amplifying said temporally spaced sequence of lower-energy pulses; and
    recombining said temporally spaced amplified pulses into a final amplified output pulse.

12. The method of claim 11, wherein a first sequence of M birefringent crystals is employed to divide said initial pulse into a sequence of $2^M$ pulses, said pulses having alternating linear polarizations.

13. The method of claim 12, wherein said birefringent elements comprise a sequence of birefringent crystals 1, 2, ..., N, wherein the crystals at odd-numbered positions in the sequence have their optic axes oriented at a 45-degree angle to a direction of linear polarization of the pulse to be amplified, while the crystals at the even-numbered positions are oriented in the same direction as the linear polarization of the pulse to be amplified, so that at each crystal, a pulse is split into two equal-intensity pulses, one an ordinary (o) wave pulse and a second extraordinary (e) wave pulse.

14. The method of claim 13, wherein said o and e pulses are separated in time by $\Delta t = |1/v_e - 1/v_o| L$, where $v_o$ and $v_e$ are the group velocities of the o- and e-waves and L is the crystal length; the length of the shortest crystal (which we take as the first crystal, $L_1$) is chosen so that $\Delta t$ exceeds the pulse duration; and the length of the $m^{th}$ crystal in the sequence is $L_m = 2^{m-1} L_1$ to produce equally-spaced pulses.

15. The method of claim 12, wherein the amplified pulses are recombined in a second sequence of birefringent crystals.

16. The method of claim 15, wherein said birefringent crystals are formed from Yttrium vanadate.

17. The method of claim 12, wherein the pulses have alternating polarizations that are separated with a polarizing beam splitter, and counter-propagate through a gain medium that requires specific direction of linear polarization; and, a wave plate exchanges the direction of polarization of the counter-propagating beams, ensuring the correct polarizations for the beam entering the gain medium, and reverses the pulse replicas before the replicas are recombined into a final output pulse.

18. The method of claim 11, wherein said pulses are amplified by a polarization-insensitive Yb-doped fiber amplifier.

19. The method of claim 11, wherein the polarization of the divided pulses is rotated by 90 degrees before they are recombined so that all pulses experience the same total delay and thus recombine into said output pulse.

20. The method of claim 11, wherein said input pulse is divided by passing said pulse through a stack of birefringent crystals in a first direction and said amplified sequence of pulses is recombined to form said amplified pulse by passing said sequence of amplified pulses through said stack of birefringent crystals in a second, opposite direction.

* * * * *